US012365108B2

(12) United States Patent
Häupel et al.

(10) Patent No.: US 12,365,108 B2
(45) Date of Patent: Jul. 22, 2025

(54) PILE CUTTING APPARATUS WITH SUPPORT ELEMENT

(71) Applicant: KOENIG & BAUER AG, Würzburg (DE)

(72) Inventors: Stephan Häupel, Heßheim (DE); Martin Palme, Kist (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/716,528

(22) PCT Filed: Jan. 27, 2023

(86) PCT No.: PCT/EP2023/052018
§ 371 (c)(1),
(2) Date: Jun. 5, 2024

(87) PCT Pub. No.: WO2023/148096
PCT Pub. Date: Aug. 10, 2023

(65) Prior Publication Data

US 2024/0424706 A1 Dec. 26, 2024

(30) Foreign Application Priority Data

Feb. 2, 2022 (DE) ..................... 10 2022 102 391.5

(51) Int. Cl.
*B26D 7/06* (2006.01)
*B26D 7/02* (2006.01)

(52) U.S. Cl.
CPC ........... *B26D 7/0675* (2013.01); *B26D 7/025* (2013.01)

(58) Field of Classification Search
CPC .............................. B26D 7/025; B26D 7/0675
See application file for complete search history.

(56) References Cited

U.S. PATENT DOCUMENTS

| | | | |
|---|---|---|---|
| 3,146,650 | A | 9/1964 | Sarring |
| 3,913,750 | A | 10/1975 | Sarring |

(Continued)

FOREIGN PATENT DOCUMENTS

| | | | |
|---|---|---|---|
| DE | 62300 | B1 | 11/1974 |
| DE | 3302946 | A1 | 8/1983 |

(Continued)

OTHER PUBLICATIONS

International Search Report of PCT/EP2023/052018 dated May 4, 2023.

*Primary Examiner* — Liang Dong
(74) *Attorney, Agent, or Firm* — Mattingly & Malur, PC

(57) ABSTRACT

Examples include a pile cutting apparatus including a cutting device for cutting a sheet pile, with a front pile bearing surface, a rear pile bearing surface, and a cutting gap arranged therebetween. A table plane contains the front pile bearing surface. The cutting device further includes a movable upper blade, a lower blade including a cutting edge, and a cutting aid for fixing sheet piles that is upstream from the upper blade along a transport path for transporting sheet piles. A movable support element has a contact surface for supporting sheets and is movable between a support position and a disposal position. The contact surface, when the support element is arranged in the support position, is arranged in and/or beneath the table plane, and is closer to the cutting edge when the support element is in the support position than when the support element is in the disposal position.

16 Claims, 9 Drawing Sheets

(56) References Cited

U.S. PATENT DOCUMENTS

| | | | | | |
|---|---|---|---|---|---|
| 4,246,816 | A | * | 1/1981 | Ivanoff ................ | B23D 33/025<br>83/636 |
| 4,505,173 | A | | 3/1985 | Hartlage | |
| 2007/0227323 | A1 | | 10/2007 | Meyer | |

FOREIGN PATENT DOCUMENTS

| | | | | |
|---|---|---|---|---|
| DE | 3513418 | A1 | | 10/1985 |
| DE | 3829682 | A1 | | 3/1989 |
| DE | 102009053978 | A1 | | 6/2011 |
| EP | 0978357 | A2 | | 2/2000 |
| EP | 1018408 | A1 | | 7/2000 |
| EP | 1129972 | A2 | | 9/2001 |
| FR | 1150136 | A | * | 4/1956 |
| WO | 1991/00168 | A1 | | 1/1991 |

* cited by examiner

PILE CUTTING APPARATUS WITH SUPPORT ELEMENT

CROSS-REFERENCES TO RELATED APPLICATIONS

This application is the US national phase, under 35 USC § 371, of PCT/EP2023/052018, filed on Jan. 27, 2023, published as WO 2023/148096 A1 on Aug. 10, 2023, and claiming priority to DE 10 2022 102 391.5, filed Feb. 2, 2022, and all of which are expressly incorporated by reference herein in their entireties.

TECHNICAL FIELD

The invention relates to a pile cutting apparatus with a support element.

BACKGROUND

Pile cutting apparatuses that have a lowerable upper blade and a stationary lower blade are known. In this way, multiple-up piles are detached from sheet piles. A cutting edge of the upper blade has to be lowered at least a certain distance below a cutting edge of the lower blade for the cutting operation to be carried out completely. In particular when an edge is trimmed, it is possible for the part of the bottommost sheet which protrudes beyond the lower blade to sag downwardly. When the cutting edge of the upper blade is then guided past the cutting edge of the lower blade, the bottommost sheet may be bent around the cutting edge of the lower blade, especially when the sheets are thin. As a result, the bottommost sheet is not cut cleanly, but, for example, only a layer thereof is scraped off. What remains is a part at the bottommost sheet, which is actually to be detached, causing problems during further processing.

A pile cutting apparatus comprising a cutting device is known from EP 1 018 408 A1, which has a guide plate that can be pivoted about an axis and by means of which a detached multiple-up pile can be held in shape laterally when the pile is being moved into a raised position after a cutting operation.

A pile cutting apparatus is known from DE 10 2009 053 975 A1, which has a movable protective element that, on the one hand, is to prevent cut paper strips from making their way onto a front table and, on the other hand, can be used to push partial piles onto the front table after cutting.

A pile cutting apparatus is known from DD 62 300 B1, in which a pile of sheets is transported across a cutting gap so as to be cut by an upper blade arranged behind the cutting gap and cooperating with a cutting bar. A pivotable bridge element is arranged in the cutting gap.

An apparatus for cutting stacks of books is known from DE 38 29 682 A1. The apparatus comprises a cutting bar cooperating with an upper blade arranged behind a cutting gap. A pivotable bridge element is arranged in the cutting gap.

A pile cutting apparatus is known from FR 1 150 136 A, which has an upper blade cooperating with a cutting bar. In the region behind the blade, the pile bearing surface can be folded down to create a gap through which scrap pieces can be disposed of.

An apparatus for cutting books is known from U.S. Pat. No. 3,913,750 A as well as U.S. Pat. No. 3,146,650 A, which comprises an upper blade and a lower blade having cutting edges. The blade is arranged behind a gap in the transport direction. The gap can be covered by a pivotable bridge element.

An apparatus for cutting books is known from DE 33 02 946 A1 and DE 35 13 418 A1, which comprises an upper blade cooperating with a cutting bar. The blade is arranged at the rear end of a cutting gap. A bridge element for transporting the books across the cutting gap is provided.

An apparatus for cutting piles of sheets is known from WO 91/00 168 A1 as well as US 2007/0 227 323 A1, each of which comprises an upper blade cooperating with a cutting bar. Cuttings are removed by way of a linearly movable table according to WO 91/00 168 A1. US 2007/0 227 323 A1 comprises a bridge element that has to be open during the cutting operation to remove the cuttings.

An apparatus for cutting the edges of books is known from EP 1 129 972 A2.

SUMMARY

It is the object of some examples herein to provide a pile cutting apparatus with a support element.

The object is achieved according to some examples herein by a pile cutting apparatus that includes at least one first cutting device for cutting at least one sheet pile; at least one first front bearing device having a first front pile bearing surface; and at least one first rear bearing device having a first rear pile bearing surface. The first rear pile bearing surface is used to carry at least one respective detached intermediate pile or multiple-up pile. A cutting gap is provided between the first front pile bearing surface and the first rear pile bearing surface. A first table plane contains the first front pile bearing surface. The first cutting device includes at least one movable upper blade and at least one lower blade including a cutting edge. The first cutting device further includes at least one first cutting aid for fixing sheet piles, which is arranged to be movable at least with respect to a vertical direction, and which is arranged upstream from the first upper blade along a transport path provided for transport of sheet piles and/or intermediate piles and/or multiple-up piles. The first cutting device includes at least one movable support element, which has at least one contact surface provided for supporting sheets and which is arranged to be movable at least between a support position and at least one first disposal position. The at least one support element, at least in the support position, is arranged between the first front pile bearing surface and the first rear pile bearing surface. The at least one contact surface of the support element, when the support element is arranged in the support position, is arranged in and/or beneath the first table plane. The at least one contact surface of the support element is arranged closer to the cutting edge of the bottom blade when the support element is arranged in the support position than when the support element is arranged in the disposal position.

A pile cutting apparatus comprises at least one in particular first cutting device for cutting at least one pile of sheets, in particular a cutting device for cutting piles of sheets to yield multiple-up piles. The pile cutting apparatus comprises at least one first front bearing device having a first front pile bearing surface. A first at least temporarily horizontal table plane contains this first front pile bearing surface at least partly, and preferably completely. The in particular first pile cutting apparatus preferably comprises at least one first rear bearing device having a first rear pile bearing surface. A cutting gap is preferably provided between the first front pile bearing surface and the first rear pile bearing surface. The in particular first pile cutting device has at least one movable upper blade and at least one in particular stationary lower blade. The lower blade preferably has a cutting edge. The first cutting device preferably has at least one first cutting aid for fixing piles of sheets, which is arranged so as to be at least movable with respect to a vertical direction and which is arranged in front of the first upper blade along a transport path provided for transporting piles of sheets and/or intermediate piles and/or multiple-up piles.

The in particular first pile cutting device comprises at least one movable support element, which has at least one contact surface for supporting sheets, in particular from beneath, and which is arranged so as to be movable, for example switchable, in particular pivotable, between a support position and at least one first disposal position. The at least one contact surface of the support element is arranged in and/or beneath the first table plane when the support element is arranged in the support position. The at least one contact surface of the support element is arranged closer to an in particular stationary and/or lower cutting edge of the lower blade when the support element is arranged in the support position than when the support element is arranged in the disposal position. This offers the advantage that even a very short end of a bottommost sheet of the pile can be propped from beneath to prevent this end from being folded when the upper blade is lowered and being only partly scraped off, instead of being cleanly detached. In addition, it can be ensured that the sheet end during forward feeding does not inadvertently end up in a clearance, which is necessary to create space for the upper blade. Preferably, the at least one contact surface of the support element is at least partly, and more preferably completely, arranged beneath the first table plane when the support element is arranged in the disposal position.

In one refinement, the pile cutting apparatus is characterized in that the support element is arranged pivotably about a switching axis. This offers the advantage that a relatively simple movement is carried out and only little installation space is required.

In an alternative or additional refinement, the pile cutting apparatus is preferably characterized in that the first cutting device comprises at least one bridge element, which in particular differs from the support element and which can be moved between at least one transfer position and at least one interruption position. The bridge element preferably has at least one prop surface. It is preferable that the prop surface is preferably completely located in the first table plane and/or has a vertical normal vector when the bridge element is arranged in the transfer position. When the bridge element is arranged in the interruption position, the prop surface thereof is preferably located at least 50%, more preferably at least 75%, still more preferably at least 95%, and still more preferably at least 99% outside the first table plane and/or has a normal vector that deviates from a vertical direction. This offers the advantage that even components of the sheet piles which are to be detached and further processed can be delivered properly to a subsequent bearing surface, and the advantages of the support element are nonetheless preserved.

In an alternative or additional refinement, the pile cutting apparatus is preferably characterized in that the at least one bridge element is arranged pivotably about a pivot axis. This offers the advantage that a relatively simple movement is carried out and only little installation space is required. In an alternative or additional refinement, the pile cutting apparatus is preferably characterized in that the at least one support element and the at least one bridge element are rigidly connected to one another and/or can be pivoted together about the switching axis. This offers the advantage that only one drive system is necessary to carry out both movements.

In an alternative or additional refinement, the pile cutting apparatus is preferably characterized in that the first cutting device comprises at least one shielding element, which can be moved between at least one shielding position and at least one release position. When the shielding element is arranged in the shielding position thereof, the shielding element is preferably at least partly arranged above the first table plane. The shielding element is preferably arranged completely beneath the first table plane when the shielding element is arranged in the release position thereof. This offers the advantage that scrap pieces only occur in regions intended for this purpose. The at least one shielding element is preferably rigidly arranged relative to the at least one support element and/or is rigidly arranged with respect to the at least one bridge element. It is then, in turn, possible to utilize a shared drive.

In an alternative or additional refinement, the pile cutting apparatus is preferably characterized in that a surface normal of the contact surface of the support element forms an angle with a surface normal of the prop surface of the bridge element which is at least 30°, more preferably at least 45°, still more preferably at least 60°, and still more preferably at least 80°, and which is no more than 150°, more preferably no more than 135°, still more preferably no more than 120°, and still more preferably no more than 100°. This offers the advantage that, depending on the pivoted position, the support element or the contact element is employed, and the respective other element does not block the path.

The at least one support element, at least in the support position thereof, and preferably always, is arranged between the first front pile bearing surface and the first rear pile bearing surface, in particular along a transport path provided for sheet piles. As a result, only little installation space is required.

In an alternative or additional refinement, the pile cutting apparatus is preferably characterized in that the first pile cutting device has at least one lowerable cutting aid for pressing a part of a respective sheet pile against the first front pile bearing surface and/or that the first pile cutting device comprises at least one lowerable hold-down device for pressing a part of a respective sheet pile, in particular a part to be detached, against the first rear pile bearing surface. This enables an especially clean cut.

In an alternative or additional refinement, the pile cutting apparatus is preferably characterized in that a guide surface for influencing a drop path of detached pile components is arranged beneath the upper blade. Scrap pieces can then be transported especially easily along a path provided for them, for example into a waste container.

BRIEF DESCRIPTION OF THE DRAWINGS

An exemplary embodiment of the invention is illustrated in the drawings and will be described in greater detail below. The drawings show.

DETAILED DESCRIPTION

Figure 1:
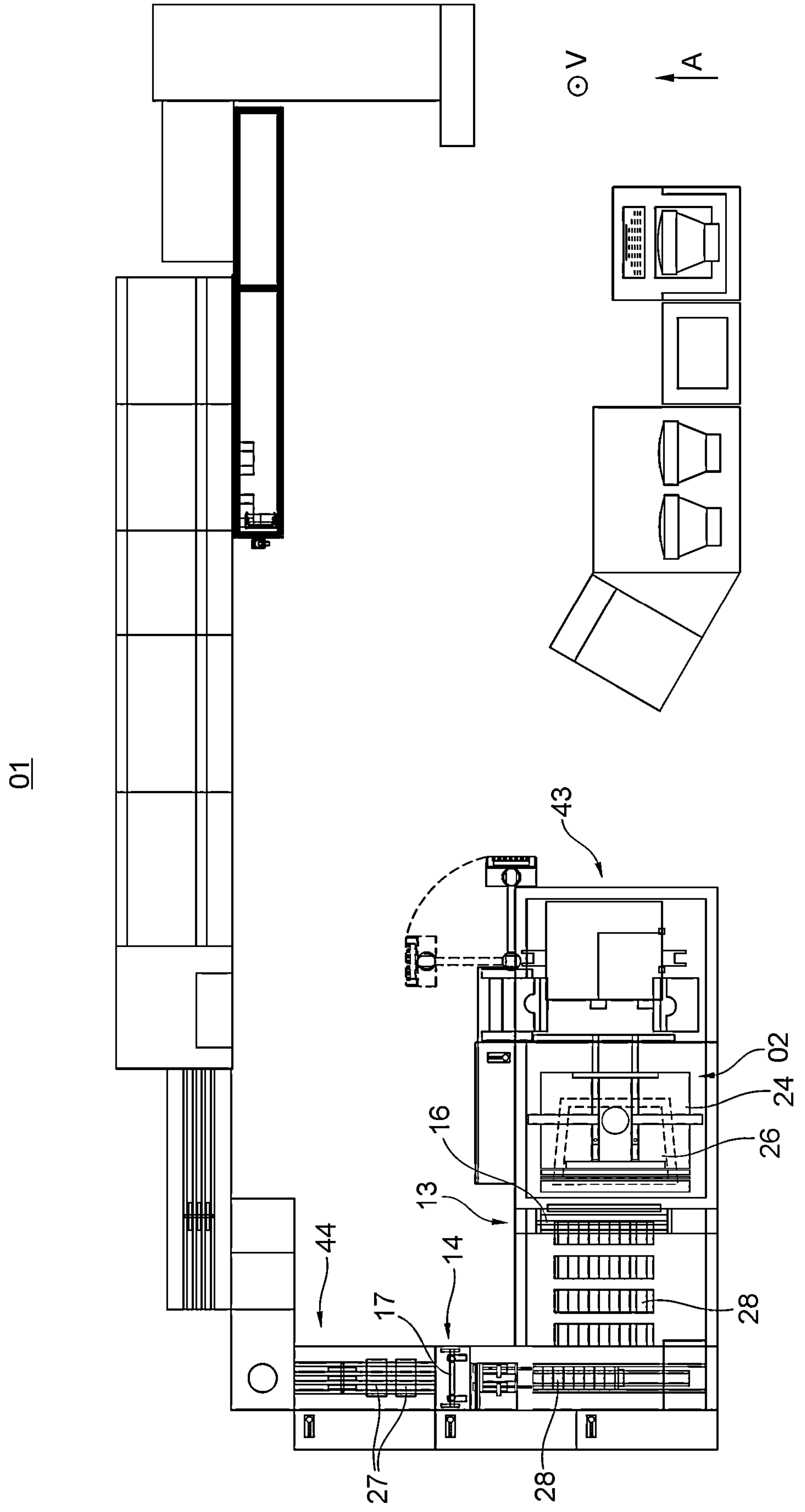
FIG. 1 a schematic representation of a pile cutting apparatus in a top view.

A pile cutting apparatus 01 for cutting sheet piles 26 into multiple-up piles 27, in particular securities piles 27, preferably comprises at least one in particular first cutting device 13, which is also referred to as an in particular first pile cutting device 13. The first cutting device 13 is preferably designed as a first cutting device 13 for cutting at least one sheet pile 26, in particular for cutting sheet piles 26 into multiple-up piles 27.

In addition to the first cutting device 13, the pile cutting apparatus 01 preferably comprises at least one second cutting device 14, which is also referred to as an in particular second pile cutting device 14. By providing multiple cutting devices 13; 14, unnecessary multiple pivoting of the corresponding piles can be dispensed with, and the throughput can be increased.

The first cutting device 13 preferably comprises at least one first knife bar 16, at which a first cutting blade 18 is arranged, which is referred to as a first upper blade 18. The first upper blade 18 preferably has a first upper cutting edge 21, which is preferably designed as a linear cutting edge 21. A respective cutting edge 21; 22; 81 is preferably an in particular straight line at which two surfaces of a corresponding cutting blade 18; 19; 77 come together and which is designed to sever or detach material. The first knife bar 16 is preferably arranged so as to be movable along a preferably linear, and more preferably exclusively linear, first adjustment path, in particular in and/or counter to a first adjustment direction A1.

The pile cutting apparatus 01 comprises at least one first front bearing device 11 having a first front pile bearing surface 04. It is in particular assigned to the first cutting device 13. The first front bearing device 11 is also referred to as a first front table 11. A first table plane E contains this first front pile bearing surface 04, preferably completely, at least to the extent that this pile bearing surface 04 has a planar design. This must be distinguished from an imaginary plane that only intersects the pile bearing surface 04, that is, only shares an intersecting line with the same. The first table plane E is preferably at least temporarily, in particular at least during cutting operations, and more preferably permanently horizontally oriented. The first front pile bearing surface 04 is used, in particular, to carry a sheet pile 26 to be cut prior to a respective cutting operation and/or during a respective cutting operation. The first pile cutting device 13 comprises at least one movable first upper blade 18 and at least one, in particular stationary, cutting blade 77 designed as a first lower blade 77. The first lower blade 77 preferably has a cutting edge 81, which is referred to as a lower cutting edge 81. For example, at least a part of the first lower blade 77 forms a part and/or a continuation of the first front pile bearing surface 04. For example, the cutting edge 81 of the first lower blade 77 forms a delimitation of the first front pile bearing surface 04 and/or the cutting edge 81 of the first lower blade 77 is arranged in front of the cutting gap 76, based on the transport path provided for the sheet pile 26.

The pile cutting apparatus 01 preferably comprises at least one first rear bearing device 68 having a first rear pile bearing surface 69. The first rear pile bearing surface 69 is used to carry at least one respective detached intermediate pile 28 or multiple-up pile 27. A cutting gap 76 is preferably provided between the first front pile bearing surface 04 and the first rear pile bearing surface 69. This cutting gap 76 extends along the transport path provided for sheet piles 26, for example over at least 2 cm, preferably at least 4 cm, and more preferably at least 6 cm and, independently thereof, for example, over no more than 20 cm, more preferably no more than 10 cm, and still more preferably no more than 8 cm. This cutting gap 76 is used in particular to be able to lower the first upper blade 18 to beneath the first table plane E and/or to receive at least one support element 78 and/or at least one bridge element 83 and/or at least one shielding element 86 and/or at least one switching device 89 and/or to transport away scrap pieces 91. The first table plane E preferably contains this rear pile bearing surface 69 at least partly, and in particular completely. Sheet piles 26 can then lie flat for cutting.

The first pile cutting device 13 comprises at least one movable support element 78, which has at least one contact surface 79 for supporting sheets 71, in particular from beneath. The at least one support element 78 is arranged so as to be movable, in particular switchable, and preferably pivotable between a support position and at least one first disposal position. The contact surface 79 is preferably at least partly designed as a planar contact surface 79. The at least one contact surface 79 of the support element 78 is arranged in and/or beneath the first table plane E at least when the support element 78 is arranged in the support position. In particular, no component of the contact surface 79 of the support element 78 is arranged above the table plane E when the support element 78 is arranged in the support position. The at least one contact surface 79 of the support element 78 is arranged closer to the in particular stationary cutting edge 81 of the lower blade 77 when the support element 78 is arranged in the support position than when the support element 78 is arranged in the disposal position. The distance to be considered in each case is the smallest possible distance. Preferably, the at least one contact surface 79 of the support element 78 is at least partly, and more preferably completely, arranged beneath the first table plane E when the support element 78 is arranged in the disposal position.

For example, the at least one support element 78 is arranged pivotably about a switching axis 82, in particular in order to be switched between different positions. Such positions are, for example, an intake position and/or the support position and/or the first disposal position and/or a second disposal position.

Figure 2:
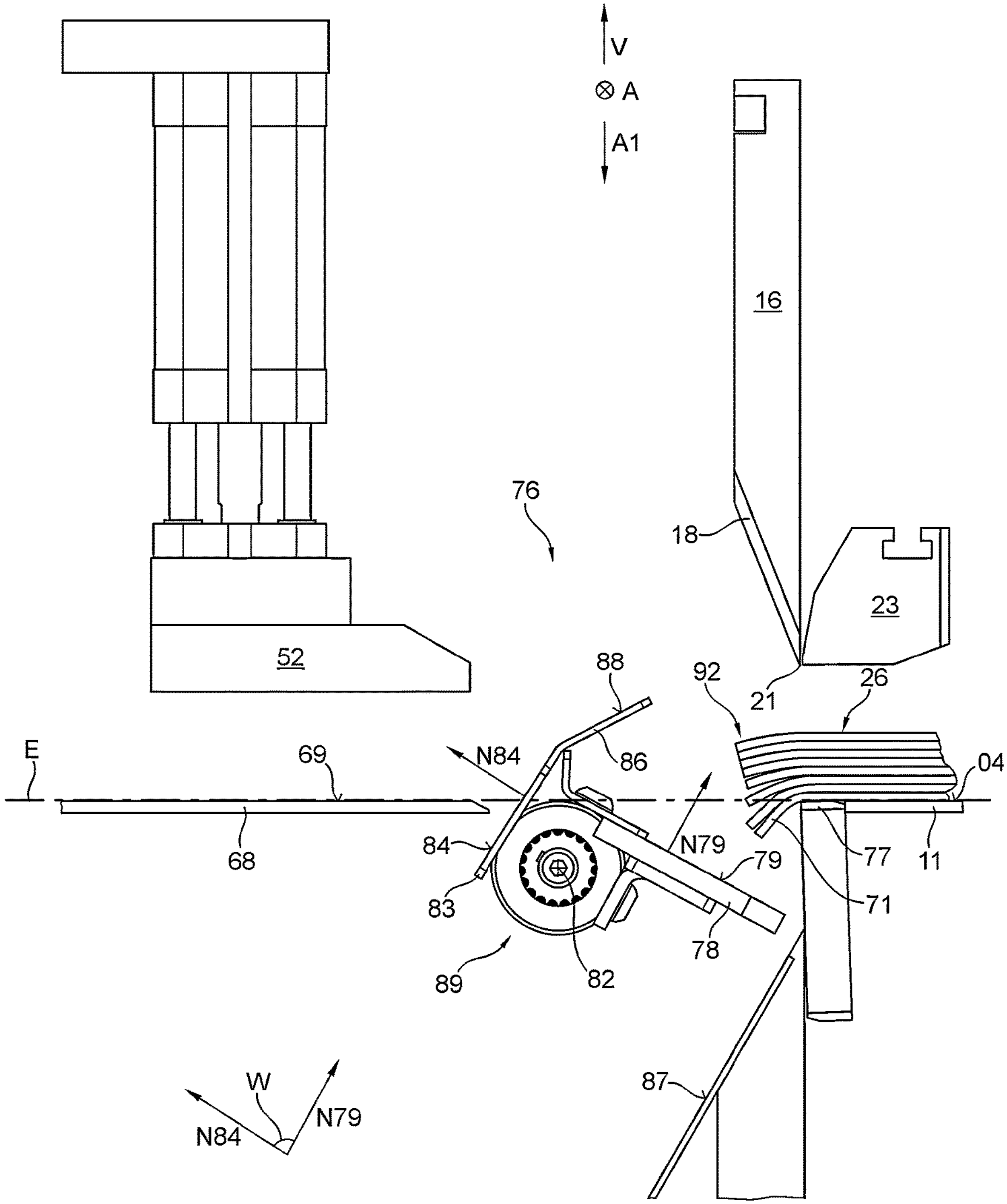
FIG. 2 a schematic representation of a first cutting device in a side view, wherein a switching device is arranged in an intake state, and a support element is arranged in an intake position, and a bridge element is arranged in an interruption position, and a shielding element is arranged in a shielding position, and an edge region of a sheet pile protrudes beyond a lower blade.

The intake position of the support element 78 is used, in particular, to be able to position an edge region 92 of a sheet pile 26 to be cut off relative to the lower blade 77 and/or the upper blade 18 of the first cutting device 13 in such a way that an edge can be trimmed thereafter. During the edge trimming process, the support element 78 should be spaced a distance apart from the lower blade 77 so that the cutting edge 21 of the upper blade 19 can be moved, in particular lowered, at least a certain distance beneath the cutting edge 81 of the lower blade 77 and/or beneath the first table plane E. This results in a clearance, which constitutes part of the cutting gap 76. The clearance extends along the transport path provided for sheet piles 26, for example over at least 2 mm, and preferably at least 4 mm and, independently thereof, for example, over no more than 20 mm, more preferably no more than 10 mm, and still more preferably no more than 8 mm. However, the edge region 92 of the sheet pile 26 must pass this clearance during the positioning of the pile. The risk would then be that at least the edge of the bottommost sheet 71 could slide into the clearance and thus not be supported by the support element 78. For this reason, first the support element 78 is positioned in the intake position, then the sheet pile 26 is positioned relative to the lower blade 77 and/or the upper blade 18 of the first cutting device 13, and then the support element 78 is moved, in particular lifted and/or pivoted, into the support position. If necessary, a part of the sheets 71 of the sheet pile 26 to be cut is lifted. The at least one contact surface 79 of the at least one support element 78 is preferably arranged beneath the first table plane E and closer to the cutting edge 81 of the lower blade 77 when the support element 78 is arranged in the intake position than when the support element 78 is arranged in the disposal position. The at least one contact surface 79 of the at least one support element 78 is arranged closer to the cutting edge 81 of the lower blade 77 when the support element 78 is arranged in the support position than when the support element 78 is arranged in the intake position. (The support element 78 is shown in the intake position thereof by way of example in FIG. 2).

Figure 3:
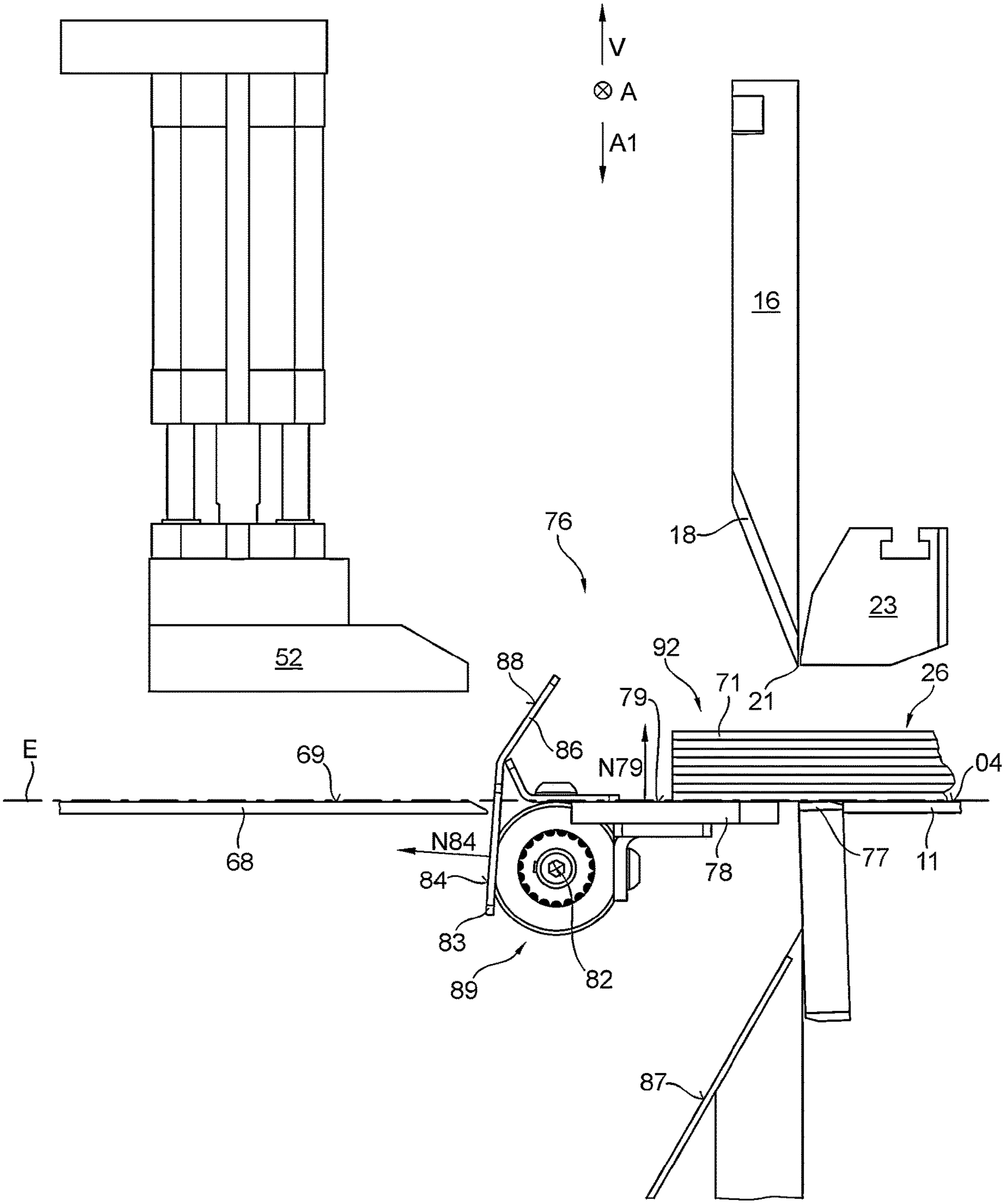
FIG. 3 a schematic representation according to FIG. 2, wherein the switching device is arranged in a prop state, and the support element is arranged in the support position thereof, and the bridge element is arranged in an interruption position, and the shielding element is arranged in a shielding position.

The support position of the support element 78 is used, in particular, to prop at least the bottommost sheet 71 of a sheet pile during an edge cutting operation and to thereby prevent this sheet 71 from not being cut completely. For this purpose, the contact surface 79 of the support element 78 arranged in the support position is preferably contained in the first table plane E or arranged in a manner that only deviates slightly therefrom. (The support element 78 is shown in the support position thereof by way of example in FIG. 3).

Figure 5:
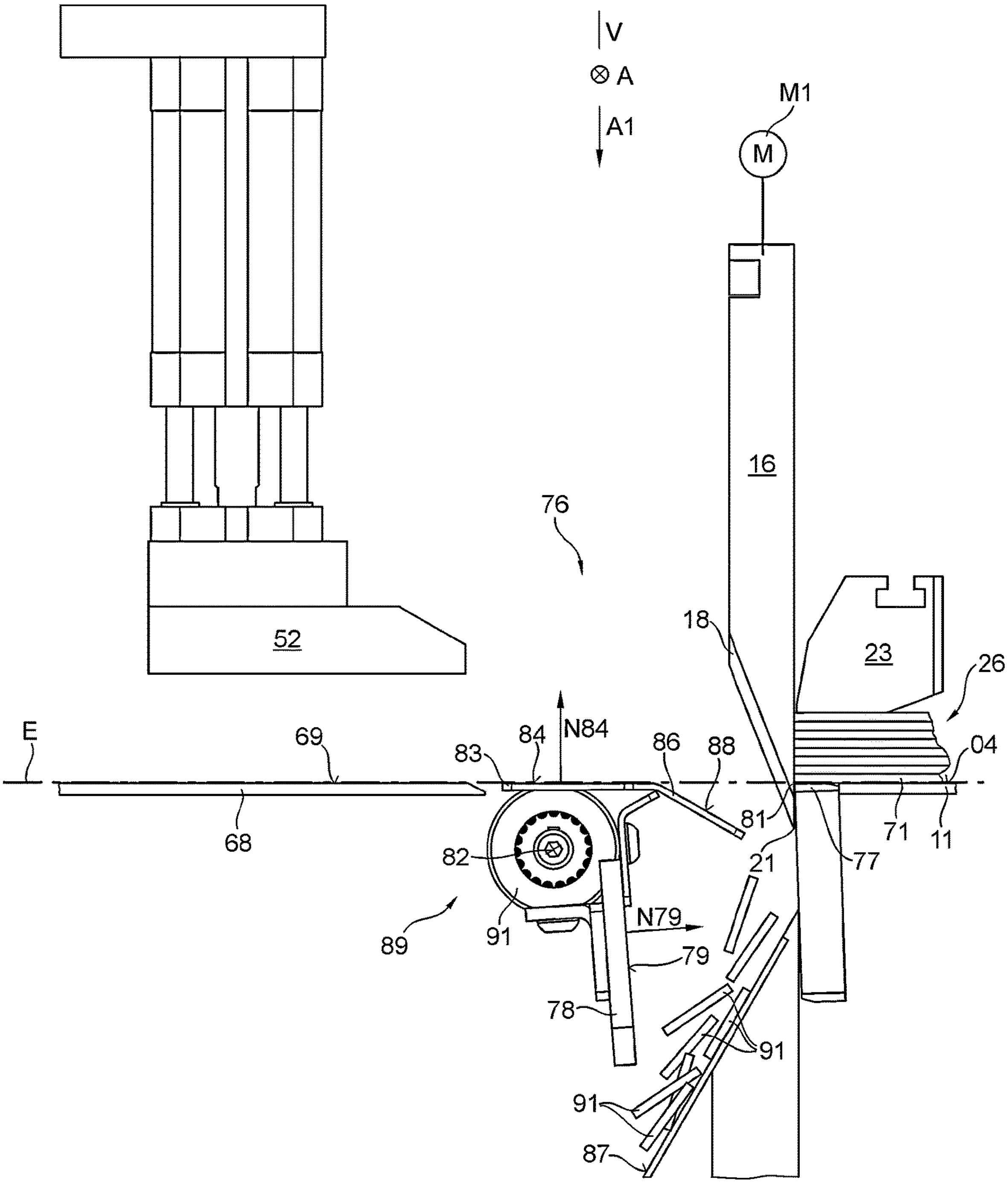
FIG. 5 a schematic representation according to FIG. 2, wherein the switching device is arranged in a transfer state, and the support element is arranged in the first disposal position thereof, and the bridge element is arranged in the transfer position thereof, and the shielding element is arranged in a release position.
Figure 6:
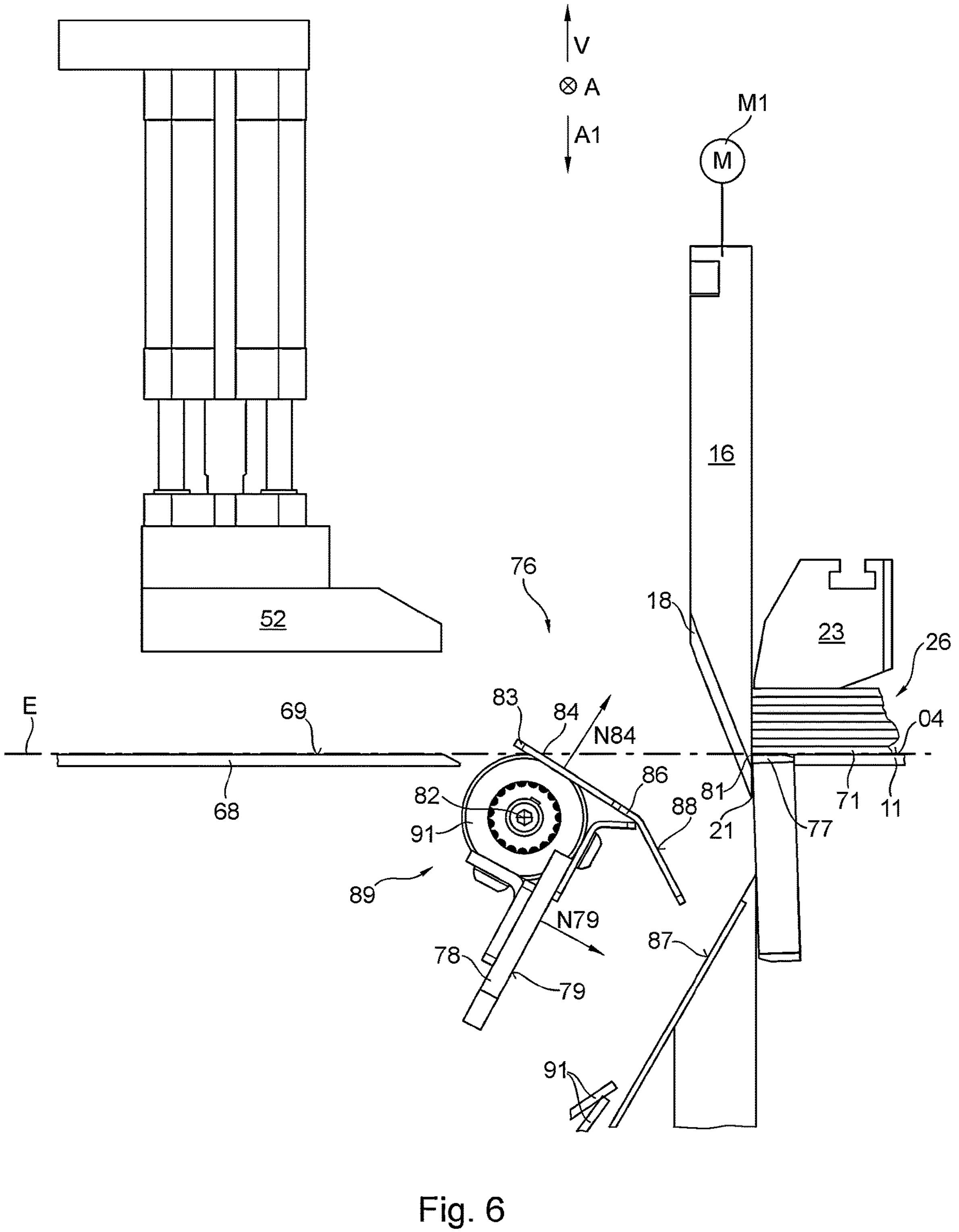
FIG. 6 a schematic representation according to FIG. 2, wherein the switching device is arranged in a disposal state, and the support element is arranged in the second disposal position thereof, and the bridge element is arranged in an interruption position, and the shielding element is arranged in a release position.

The first disposal position of the support element 78 is used, in particular, to dispose of scrap pieces 91, in particular cut-off edge pieces of the sheet pile 26 too small to be further processed. For this purpose, the support element 78 is preferably moved into the first disposal position thereof, in which the contact surface 79 thereof is essentially arranged completely outside the first table plane E. The contact surface 79 of the support element 78 is preferably obliquely arranged in the first disposal position. This preferably causes the cut-off edge pieces to slide off the support element 78. For example, this already suffices for removal. Otherwise, the support element 78 can be moved even further, in particular into the second disposal position, for example in order to create more space or widen a constriction. The second disposal position of the support element 78 is accordingly used in particular for a safe removal of the cut-off edge pieces of the sheet pile 26. (The support element 78 is shown in the first disposal position thereof by way of example in FIG. 5). (The support element 78 is shown in the second disposal position thereof by way of example in FIG. 6).

The switching axis 82 is preferably horizontally oriented. The switching axis 82 preferably extends in a transverse direction A. The transverse direction A is preferably the direction A parallel to which the cutting edge 81 of the lower blade 77 extends. The switching axis 82 is preferably located beneath the table plane E. For example, the switching axis 82 is located in the cutting gap 76 and/or along a transport path provided for sheet piles 26 downstream from the first front pile bearing surface 04, in particular between the first front pile bearing surface 04 and the first rear pile bearing surface 69, more preferably closer to the first rear pile bearing surface 69 than the first front pile bearing surface 04. Preferably, at least one pivot drive for pivoting the at least one support element 78 is provided. The at least one pivot drive is designed, for example, as an electric motor and/or as a linear motor and/or as a pneumatic drive and/or as a hydraulic drive. In a preferred embodiment, the at least one pivot drive is designed as a pair of pneumatic cylinders arranged in series. A first pneumatic cylinder is accordingly attached with the components thereof that can be moved with respect to one another to a part of the cutting apparatus which is fixed to the frame on the one hand, and to a second pneumatic cylinder on the other hand. The second pneumatic cylinder is connected with the components thereof that can be moved with respect to one another to the first pneumatic cylinder on the one hand, and to a pivotable part on the other hand, which is the support element 78 or is rigidly connected to the support element 78. By a corresponding activation of the respective two end positions of the two pneumatic cylinders, it is then possible to implement four positions of the support element, in particular the intake position, the support position, the first disposal position, and the second disposal position.

In an alternative or additional refinement, the pile cutting apparatus 01 is preferably characterized in that the first cutting device 13 comprises at least one bridge element 83, which can be moved, in particular switched, and for example pivoted, between at least one transfer position and at least one interruption position. The bridge element 83 preferably has at least one prop surface 84. When the bridge element 83 is arranged in the transfer position, the prop surface 84 thereof is located, preferably completely, in the first table plane E and/or the prop surface 84 thereof has a vertical normal vector N84. When the bridge element 83 is arranged in the interruption position, the prop surface 84 thereof is located at least 50%, preferably at least 75%, more preferably at least 95%, and still more preferably at least 99% outside the first table plane E and/or the prop surface 84 thereof has a normal vector N84 that deviates from a vertical direction V. For example, the at least one bridge element 83 is arranged pivotably about a pivot axis 82, in particular in order to be switched between different positions. Such positions are the transfer position and the at least one interruption position, for example. This pivot axis 82 is preferably the switching axis 82. The transfer position of the bridge element 83 is used in particular to securely guide a leading edge of a sheet pile 26, of which a part intended for further processing as an intermediate pile 28 or multiple-up piles 27 is to be cut off, onto the second pile bearing surface 69. For this purpose, the surface normal N84 of the prop surface 84 of the bridge element 83, when the same is in the transfer position, is preferably vertically oriented and/or the prop surface 84 of the bridge element 83, when the same is in the transfer position, is preferably contained in the first table plane E. The at least one interruption position of the bridge element 83 is used in particular to enable an adaptation of the position of the support element 78 and/or to create space for movements or repositioning of the support element 78. For example, the bridge element 83 can be arranged in several different interruption positions. The cutting gap 76 can preferably be at least partly covered by the bridge element 83. The cutting gap 76 can preferably be at least partly covered by the support element 78. The cutting gap 76 can preferably only be covered either by the bridge element 83 or by the support element 78 at any time or by neither of the two.

In an alternative or additional refinement, the pile cutting apparatus 01 is preferably characterized in that the at least one support element 78 and the at least one bridge element 83 are rigidly connected to one another. The at least one support element 78 and the at least one bridge element 83 are preferably arranged so as to be pivotable together about the switching axis 82. Preferably, a surface normal N79 of the contact surface 79 of the support element 78 forms an angle W with a surface normal N84 of the prop surface 84 of the bridge element 83. This angle W is preferably at least 30°, more preferably at least 45°, still more preferably at least 60°, and still more preferably at least 80°. The angle is preferably no more than 150°, more preferably no more than 135°, still more preferably no more than 120°, and still more preferably no more than 100°.

In an alternative or additional refinement, the pile cutting apparatus 01 is preferably characterized in that the first cutting device 13 comprises at least one shielding element 86, which can be moved, in particular switched, for example pivoted, between at least one shielding position and at least one release position. The shielding element 86 is preferably at least partly arranged above the first table plane when the shielding element 86 is arranged in the shielding position thereof. The shielding element 86 is preferably completely arranged beneath the first table plane E when the shielding element 86 is arranged in the release position thereof. The shielding position of the shielding element 86 is used in particular to prevent scrap pieces 91, in particular individual parts of cut-off edge regions 92 of a cut sheet pile 92, from being hurled onto the second pile bearing surface 69, for example during the cutting operation. The at least one shielding element 86 is preferably rigidly arranged relative to the at least one support element 78 and/or is rigidly arranged with respect to the at least one bridge element 83. The at least one shielding element 86 is preferably likewise arranged pivotably about the switching axis 82. The release position of the shielding element 86 is used in particular to allow forward feeding of a sheet pile 26 onto the second pile bearing surface 69. For example, the at least one shielding element 86 has at least one ramp surface 88 and/or the at least one shielding element 86, at least in a release position, serves as a ramp element 86, in particular to facilitate forward feeding of a respective sheet pile 26 over the cutting gap 76. This specific release position of the shielding element 86 is then referred to as a ramp position. The ramp position of the shielding element 86, serving as a specific release position of the shielding element 86, is used in particular to ensure that a potentially drooping leading end of the sheet pile 26, during the forward feeding thereof in the direction of the second pile bearing surface 69, is brought back to the level of the first table plane E.

The at least one support element 78, at least in the support position thereof, and preferably always, is arranged between the first front pile bearing surface 04 and the first rear pile bearing surface 69, in particular along a transport path provided for sheet piles 26.

In an alternative or additional refinement, the pile cutting apparatus 01 is preferably characterized in that at least one switching device 89 is provided, which comprises the at least one support element 78 and the at least one bridge element 83. More preferably, the at least one switching device 89 also comprises the at least one shielding element 86. The at least one switching device 89 comprises, for example, a base body 91, relative to which the at least one support element 78 and the at least one bridge element 83, and more preferably also the at least one shielding element 86, are rigidly arranged and/or to which the at least one support element 78 and the at least one bridge element 83, and more preferably also the at least one shielding element 86, are attached. The at least one switching device 89, and in particular the base body 91 thereof, is preferably arranged pivotably about the switching axis 82.

Figure 4:
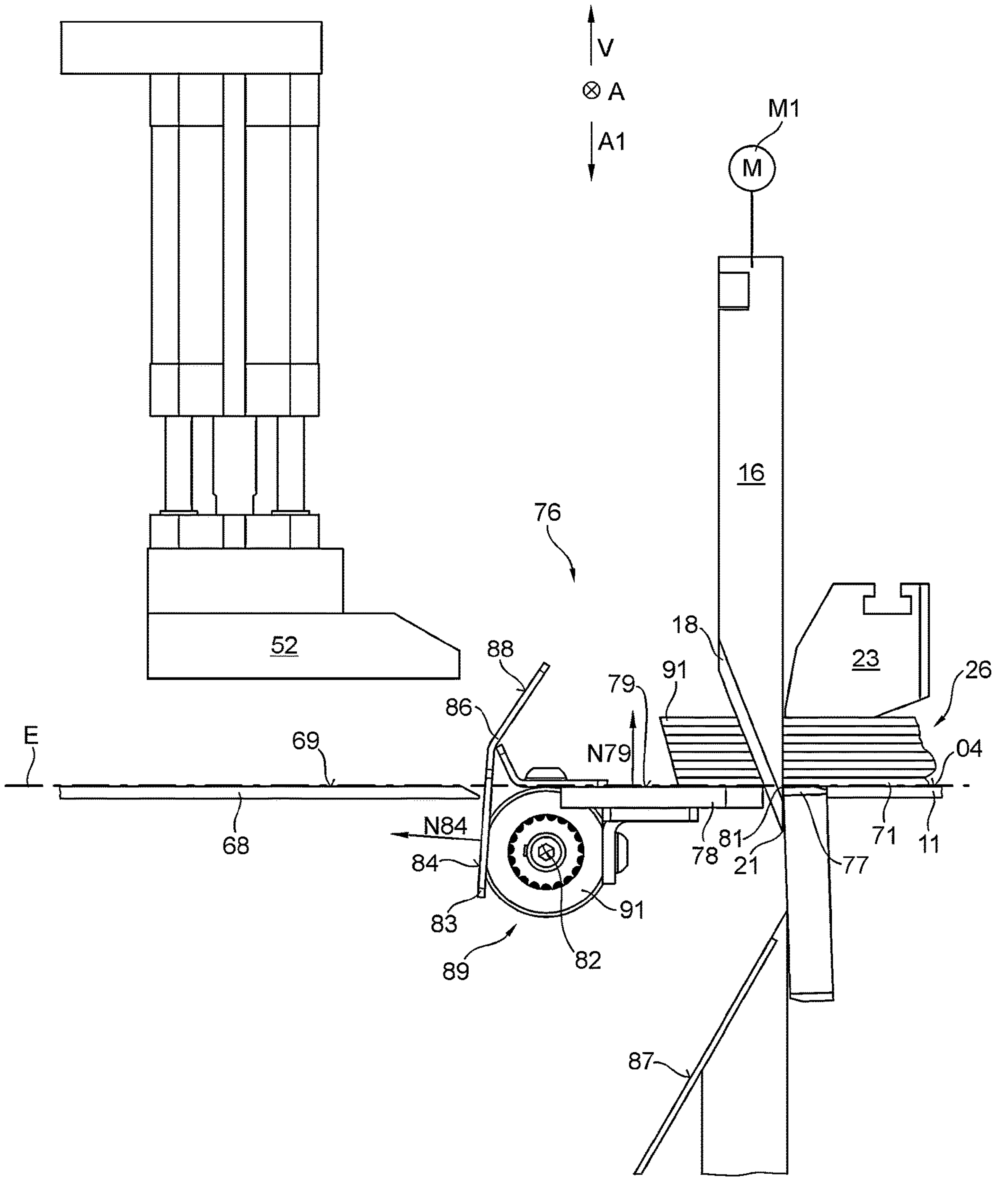
FIG. 4 a schematic representation according to FIG. 3, wherein an upper blade is lowered.
Figure 7:
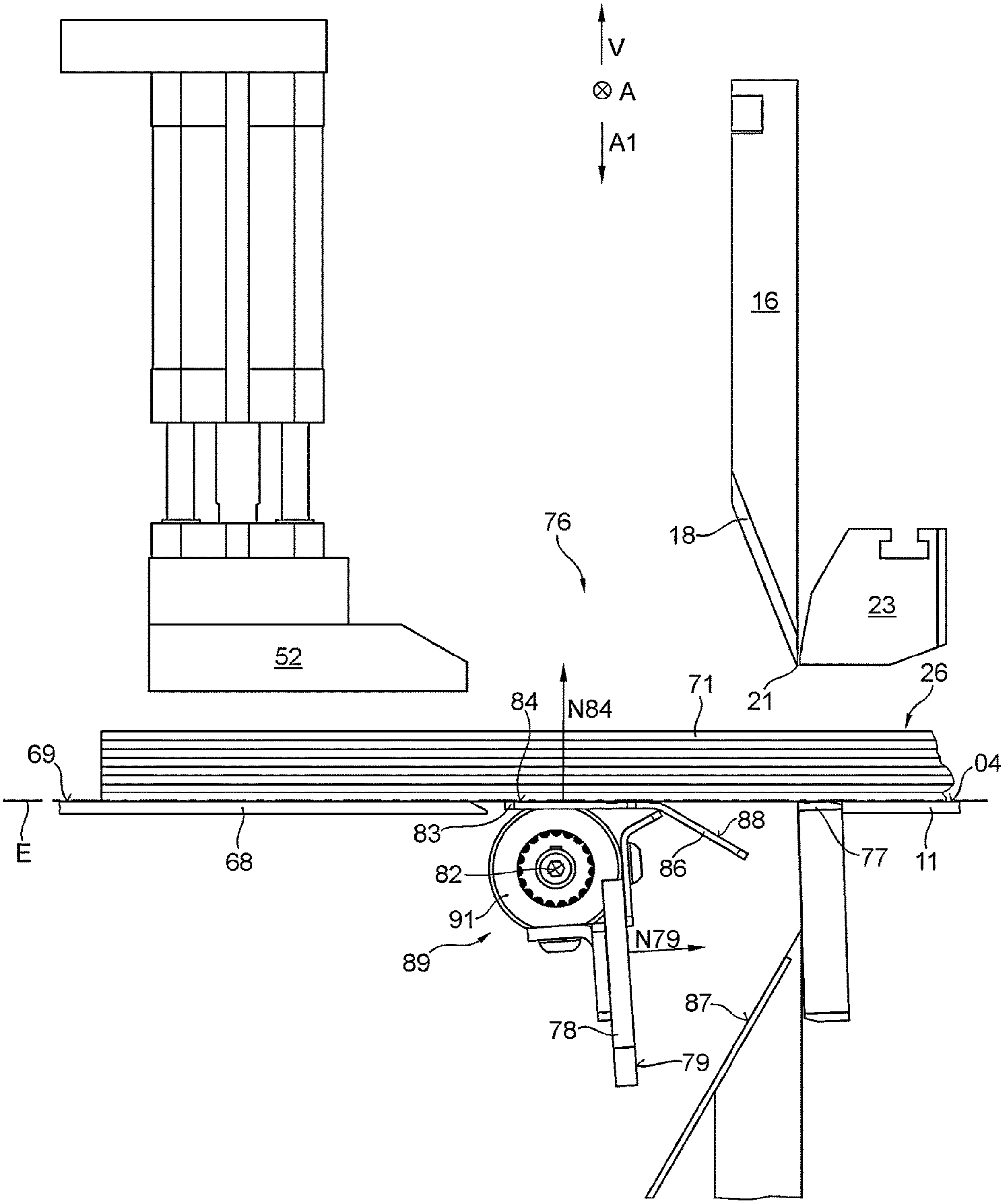
FIG. 7 a schematic representation according to FIG. 5, wherein the upper blade is lifted and the sheet pile has been advanced further.
Figure 8:
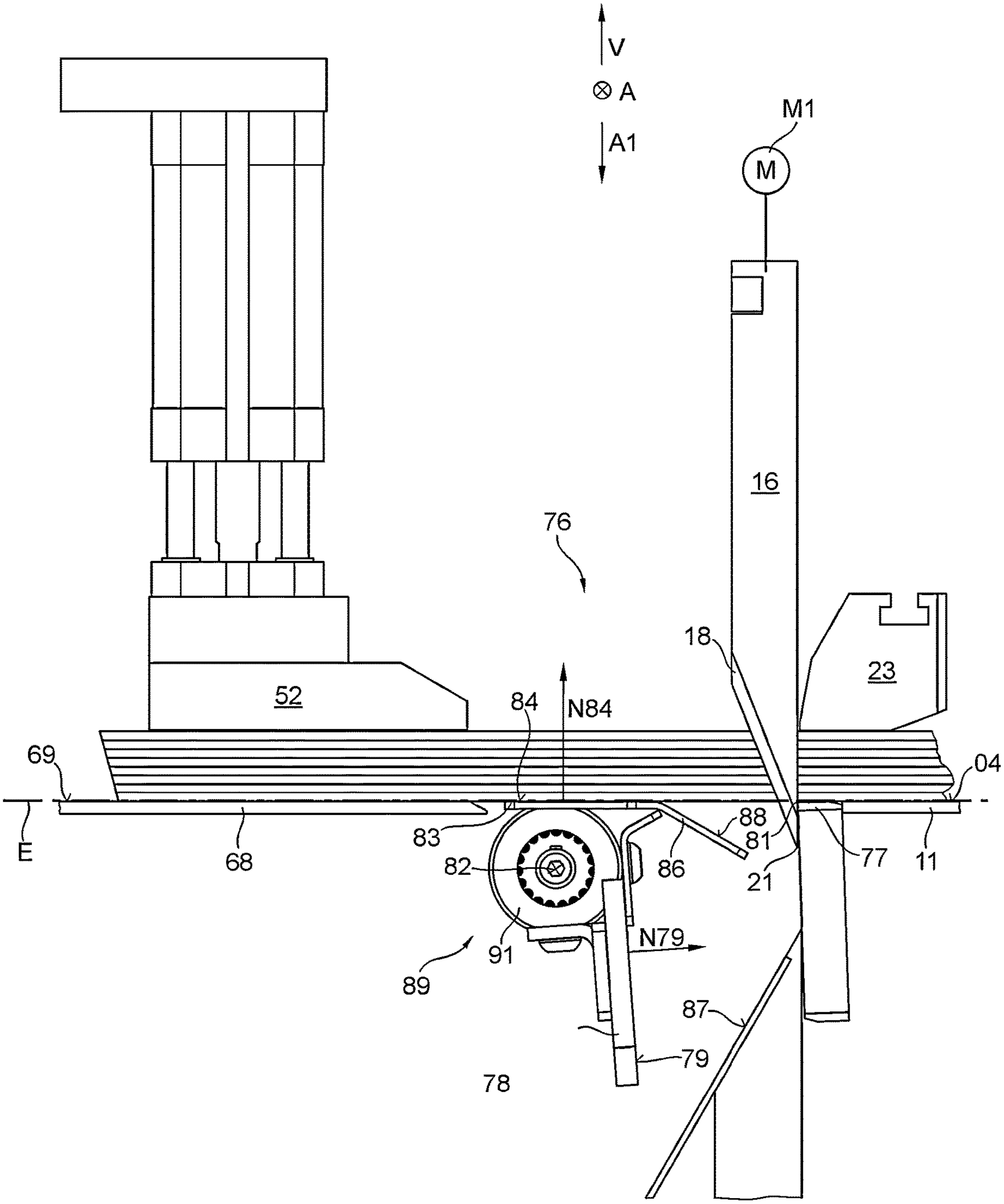
FIG. 8 a schematic representation according to FIG. 5, wherein the sheet pile has been advanced further.
Figure 9:
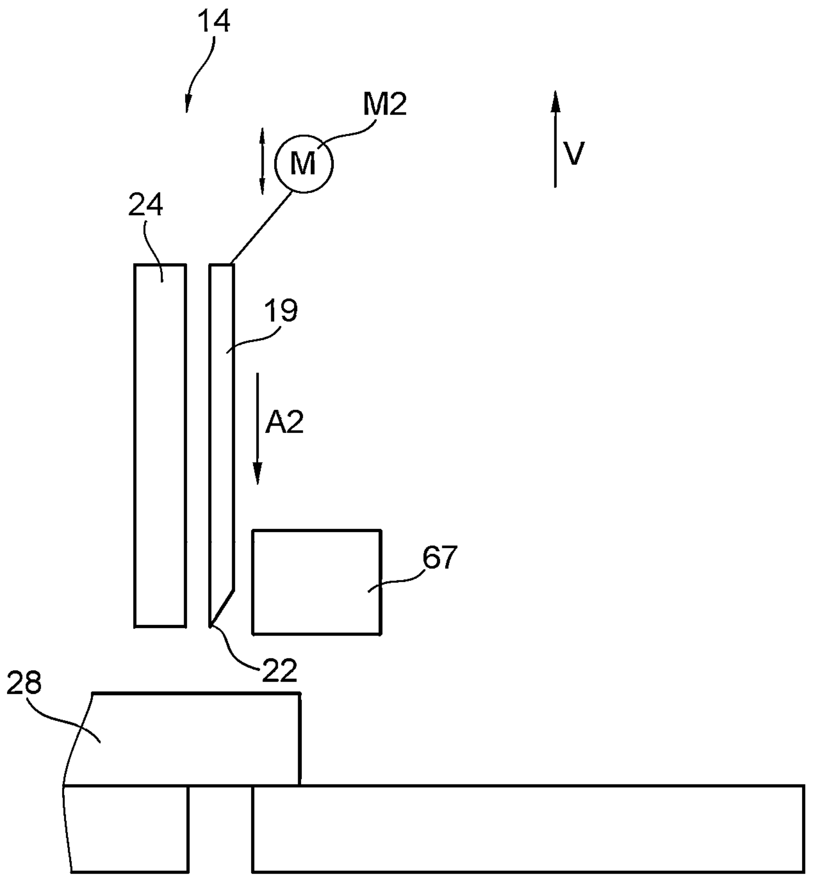
FIG. 9 a schematic representation of a second cutting device in a side view.

For example, the switching device 89 can be switched between at least four or exactly four states. A first such state is an intake state. When the switching device 89 is arranged in the intake state, the support element 78 is preferably arranged in the intake position thereof. When the switching device 89 is arranged in the intake state, the bridge element 83 is preferably arranged in an interruption position. When the switching device 89 is arranged in the intake state, the shielding element 86 is preferably arranged in a shielding position. (FIG. 2 by way of example shows a switching device in the intake state). A second such state is a prop state. When the switching device 89 is arranged in the prop state, the support element 78 is preferably arranged in the support position thereof. When the switching device 89 is arranged in the prop state, the bridge element 83 is preferably arranged in an interruption position. When the switching device 89 is arranged in the prop state, the shielding element 86 is preferably arranged in a shielding position. (FIG. 3 and FIG. 4 by way of example show a switching device in the prop state). A third such state is a transfer state. When the switching device 89 is arranged in the transfer state, the support element 78 is preferably arranged in the in particular first disposal position thereof. When the switching device 89 is arranged in the transfer state, the bridge element 83 is preferably arranged in the transfer position thereof. When the switching device 89 is arranged in the intake state, the shielding element 86 is preferably arranged in a release position, in particular in a ramp position. (FIG. 5, FIG. 7 and FIG. 8 by way of example show a switching device in the transfer state). A fourth such state is a disposal state. When the switching device 89 is arranged in the disposal state, the support element 78 is preferably arranged in the in particular second disposal position thereof. When the switching device 89 is arranged in the disposal state, the bridge element 83 is preferably arranged in an interruption position. When the switching device 89 is arranged in the disposal state, the shielding element 86 is preferably arranged in a release position. (FIG. 6 by way of example shows a switching device in the disposal state).

In an alternative or preferred refinement, the pile cutting apparatus 01 is preferably characterized in that a guide surface 87 for influencing a drop path of detached pile components or scrap pieces 91 is arranged beneath the upper blade 18. These can thus be conducted to a disposal device, for example a waste container or a transport means, after having slid off the contact surface 79 of the support device 78 following gravity.

In an alternative or additional refinement, the pile cutting apparatus 01 is preferably characterized in that the first pile cutting device 13 has at least one lowerable cutting aid 23 for pressing a part of a respective sheet pile 26 against the first front pile bearing surface 04 and/or that the first pile cutting device 13 comprises at least one lowerable hold-down device 52 for pressing a part of a respective sheet pile 26, in particular a part to be detached, against the first rear pile bearing surface 69. In particular, the first cutting device 13 is preferably characterized in that the first cutting device 13 comprises at least one first cutting aid 23, in particular a first press bar 23 for fixing sheet piles 26 and/or intermediate piles 28 and/or multiple-up piles 27, which is arranged so as to be at least movable with respect to a vertical direction V and which is arranged upstream from the first upper blade 18 along a transport path provided for a transport of sheet piles 26 and/or intermediate piles 28 and/or multiple-up piles 27. Preferably, maximum contact pressures between 0.5 $N/mm^2$ (half a newton per square millimeter) and 2 $N/mm^2$ (two newtons per square millimeter) are exerted by way of the first cutting aid 23. In this way, it can be ensured that, during cutting, no layers are displaced in relation to one another, and that a clean cut of all layers is carried out. For example, at least one first hold-down device 52 is arranged downstream from the first upper blade 18 along the provided transport path, which is in particular used to prevent cut-off components from being flung off in an uncontrolled manner.

In an alternative or additional refinement, the first cutting device 13 is preferably characterized in that the first cutting device 13 comprises at least one first cutting drive M1 for moving the first knife bar 16 in and/or counter to the first adjustment direction A1. The at least one first cutting drive M1 is designed, for example, as an electric motor M1 and/or as a linear motor M1 and/or as a pneumatic drive and/or as a hydraulic drive M1.

The preferably provided second cutting device 14 preferably comprises at least one second knife bar 17, at which a second cutting blade 19 is arranged, which is referred to as a second upper blade 19. The second upper blade 19 includes an in particular second upper cutting edge 22, which is preferably configured as a linear cutting edge 22. The second knife bar 17 is preferably arranged so as to be movable in and/or counter to a second adjustment direction A2 along a preferably linear, and more preferably exclusively linear, second adjustment path.

In an alternative or additional refinement, the second cutting device 14 is preferably characterized in that the second cutting device 14 comprises at least one second cutting aid 24, in particular a second press bar 24 for fixing sheet piles 26 and/or intermediate piles 28 and/or multiple-up piles 27, which is arranged so as to be at least movable with respect to the vertical direction V and which is arranged upstream from the second upper blade 19 along a transport path provided for a transport of sheet piles 26 and/or intermediate piles 28 and/or multiple-up piles 27. Preferably, maximum contact pressures between 0.5 $N/mm^2$ (half a newton per square millimeter) and 2 $N/mm^2$ (two newtons per square millimeter) are exerted by way of the second cutting aid 24. In this way, it can be ensured that, during cutting, no layers are displaced in relation to one another, and that a clean cut of all layers is carried out. For example, at least one second hold-down device 67 is arranged downstream from the second upper blade 19 along the provided transport path, which is in particular used to prevent cut-off components from being flung off in an uncontrolled manner.

In an alternative or additional refinement, the second cutting device 14 is preferably characterized in that the second cutting device 14 comprises at least one second cutting drive M2 for moving the second knife bar 17 in and/or counter to the second adjustment direction A2 and that the at least one second cutting drive M2 is configured as an electric motor M2 and/or as a linear motor M2 and/or as a pneumatic drive M2 and/or as a hydraulic drive M2.

In an alternative or additional refinement, the pile cutting apparatus 01 is preferably characterized in that the pile cutting apparatus 01 comprises at least one first pile positioning unit 02, in particular for positioning at least one respective sheet pile 26. A pivot axis assigned to this first pile positioning unit 02 is preferably oriented parallel to a vertical direction V. In an alternative or additional refinement, the pile cutting apparatus 01 and/or the respective cutting device 13; 14 are preferably characterized by comprising at least one sheet feed zone 43 and at least one multiple-up discharge zone 44 or securities discharge zone 44. The pile cutting apparatus 01 is used in particular to generate several multiple-up piles 27, in particular securities piles 27, from at least one respective sheet pile 26.

For example, the at least one first pile positioning unit 02 is preferably arranged immediately downstream in the sheet feed zone 43 or along a provided transport path. For example, the first cutting device 13 is arranged downstream from the first pile positioning unit 02. Preferably, the first pile positioning unit 02 is assigned to the first cutting device 13, in particular to be able to align respective sheet piles 26 in an optimized manner.

In an alternative or additional refinement, the pile cutting apparatus 01 is preferably characterized in that the at least one support element 78 is made of an elastic material, for example made of rubber. When in the support position, the support element 78 can then be arranged as close as possible to the lower blade 77 and, upon contact with the upper blade 18, be displaced thereby without any damage occurring. In this way, a critical area of the cutting gap 76 is decreased as effectively as possible.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A pile cutting apparatus (01) comprising:

at least one cutting device (13) for cutting at least one sheet pile (26), the at least one cutting device (13) including at least one movable upper blade (18) and at least one lower blade (77) having a cutting edge (81);

at least one front bearing device (11) having a front pile bearing surface (04);

at least one rear bearing device (68) having a rear pile bearing surface (69) configured for supporting a detached part of the at least one sheet pile (26);

a cutting gap (76) provided between the front pile bearing surface (04) and the rear pile bearing surface (69), wherein the front pile bearing surface (04) is configured for supporting a portion of the at least one sheet pile (26) on one side of the cutting gap (76) and the rear pile bearing surface (69) is configured for supporting another portion of the at least one sheet pile (26) on an opposing side of the cutting gap (76);

a table plane (E) containing the front pile bearing surface (04); and at least one cutting aid (23) for fixing the at least one sheet pile (26), the at least one cutting aid (23) arranged to be movable at least in a vertical direction (V), and arranged upstream from the at least one movable upper blade (18) along a transport path provided for a transport of the at least one sheet pile (26), wherein:

the at least one cutting device (13) comprises at least one movable support element (78) including at least one contact surface (79) configured for supporting sheets (71) and arranged to be movable at least between a support position and at least one disposal position, the at least one movable support element (78), at least in the support position thereof, is arranged between the front pile bearing surface (04) and the rear pile bearing surface (69), the at least one contact surface (79) of the at least one movable support element (78), when the at least one movable support element (78) is arranged in the support position, is arranged in and/or beneath the table plane (E), the at least one contact surface (79) of the at least one movable support element (78) is arranged closer to the cutting edge (81) of the at least one lower blade (77) when the at least one movable support element (78) is arranged in the support position than when the at least one movable support element (78) is arranged in the at least one disposal position, the at least one cutting device (13) comprises at least one bridge element (83) which can be moved between at least one transfer position and at least one interruption position, and the at least one bridge element (83) has at least one prop surface (84), when the at least one bridge element (83) is arranged in the at least one transfer position, the at least one prop surface (84) thereof is located in the table plane (E) and/or has a vertical normal vector (N84) so that the at least one prop surface (84) is positioned between the front pile bearing surface (04) and the rear pile bearing surface (69), and configured to provide support to the at least one sheet pile (26) during transfer of the at least one sheet pile (26) across the cutting gap (76) between the front pile bearing surface (04) and the rear pile bearing surface (69), when the at least one bridge element (83) is arranged in the at least one interruption position, the at least one prop surface (84) thereof is located at least 50% outside the table plane (E) and/or has a normal vector (N84) that deviates from the vertical direction (V), and a surface normal (N79) of the at least one contact surface (79) of the at least one movable support element (78) forms an angle (W) with a surface normal (N84) of the at least one prop surface (84) of the at least one bridge element (83) which is between at least 30° and no more than 150°.

2. The pile cutting apparatus according to claim 1, wherein the at least one movable support element (78) is arranged pivotably about a switching axis (82).

3. The pile cutting apparatus according to claim 1, wherein when the at least one bridge element (83) is arranged in the at least one interruption position, the at least one prop surface (84) is located at least 75% outside the table plane (E), and has the normal vector (N84) that deviates from the vertical direction (V).

4. The pile cutting apparatus according to claim 1, wherein the at least one bridge element (83) is arranged pivotably about a pivot axis (82).

5. The pile cutting apparatus according to claim 1, wherein the at least one movable support element (78) and the at least one bridge element (83) are rigidly connected to one another.

6. The pile cutting apparatus according to claim 1, wherein:

the at least one cutting device (13) comprises at least one shielding element (86) which can be moved between at least one shielding position and at least one release position, the at least one shielding element (86) is at least partly arranged above the table plane (E) when the at least one shielding element (86) is arranged in the at least one shielding position thereof, and the at least one shielding element (86) is completely arranged beneath the table plane (E) when the at least one shielding element (86) is arranged in the at least one release position thereof.

7. The pile cutting apparatus according to claim 1, wherein:

the at least one contact surface (79) of the at least one movable support element (78), when the at least one movable support element (78) is arranged in the at least one disposal position, is at least partly arranged beneath the table plane (E), or the at least one contact surface (79) of the at least one movable support element (78) is arranged completely beneath the table plane (E) when the at least one movable support element (78) is arranged in the at least one disposal position.

8. The pile cutting apparatus according to claim 1, wherein a guide surface (87) for influencing a drop path of cut-off pile pieces is arranged beneath the at least one movable upper blade (18).

9. The pile cutting apparatus according to claim 1, wherein the at least one cutting aid (23) is designed as a lowerable cutting aid (23) for pressing a part of a respective at least one sheet pile (26) against the front pile bearing surface (04).

10. The pile cutting apparatus according to claim 1, wherein the at least one cutting device (13) comprises at least one lowerable hold-down device (52) for pressing a part of a respective at least one sheet pile (26) against the rear pile bearing surface (69).

11. The pile cutting apparatus according to claim 1, wherein the at least one movable support element (78) is arranged pivotably about a switching axis (82), and the switching axis (82) is located beneath the table plane (E).

12. The pile cutting apparatus according to claim 11, wherein the switching axis (82) is located in the cutting gap (76).

13. The pile cutting apparatus according to claim 11, wherein the switching axis (82) is located downstream from the front pile bearing surface (04) along a transport path provided for sheet piles (26).

14. The pile cutting apparatus according to claim 11, wherein the switching axis (82) is located between the front pile bearing surface (04) and the rear pile bearing surface (69) along a transport path provided for the at least one sheet pile (26) and is located closer to the rear pile bearing surface (69) than to the front pile bearing surface (04).

15. The pile cutting apparatus according to claim 1, wherein the at least one sheet pile (26) includes at least one multiple-up pile (27).

16. The pile cutting apparatus according to claim 1, wherein the at least one sheet pile (26) includes at least one intermediate pile (28).

* * * * *